US008536736B2

(12) United States Patent
Abramo et al.

(10) Patent No.: US 8,536,736 B2
(45) Date of Patent: Sep. 17, 2013

(54) WIRELESS POWER INFRASTRUCTURE

(75) Inventors: Keith Abramo, Tonawanda, NY (US);
Joshua R. Kinlaw, Lumberton, NC (US); Joseph C. Leong, Schaumburg, IL (US); Adrian X. Rodriguez, Hialeah, FL (US); Gregory B. Woloschyn, Wooster, OH (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 12/418,264

(22) Filed: Apr. 3, 2009

(65) Prior Publication Data

US 2010/0256831 A1      Oct. 7, 2010

(51) Int. Cl.
*H04W 52/00*      (2009.01)
*H04W 40/00*      (2009.01)

(52) U.S. Cl.
USPC ........................................... 307/104

(58) Field of Classification Search
USPC ........................................... 307/104
See application file for complete search history.

(56) References Cited

U.S. PATENT DOCUMENTS

| 4,654,573 | A | * | 3/1987 | Rough et al. ................ 320/108 |
| 5,455,467 | A | * | 10/1995 | Young et al. ................ 307/104 |
| 6,037,743 | A | | 3/2000 | White et al. |
| 6,265,789 | B1 | * | 7/2001 | Honda et al. ................ 307/33 |
| 7,142,811 | B2 | * | 11/2006 | Terranova et al. ........... 455/41.1 |
| 8,035,255 | B2 | * | 10/2011 | Kurs et al. .................. 307/104 |
| 2001/0043056 | A1 | * | 11/2001 | Watanabe .................... 323/267 |
| 2002/0000792 | A1 | | 1/2002 | Hanaki |
| 2002/0074898 | A1 | * | 6/2002 | Maue et al. ................... 310/311 |
| 2003/0001707 | A1 | * | 1/2003 | Michaels et al. ............. 336/182 |
| 2004/0130915 | A1 | * | 7/2004 | Baarman ..................... 363/21.02 |
| 2004/0263411 | A1 | * | 12/2004 | Fabrega-Sanchez et al. . 343/861 |
| 2005/0003771 | A1 | * | 1/2005 | De Ruijter et al. ......... 455/127.1 |

(Continued)

FOREIGN PATENT DOCUMENTS

| CN | 1633010 A | | 6/2005 |
| JP | 11146645 | * | 5/1999 |
| JP | 2008206327 | | 9/2008 |

OTHER PUBLICATIONS

Hadley, Franklin, "Goodbye Wires . . . MIT team experimentally demonstrates wireless power transfer, potentially useful for powering laptops, cell phones without cords", MIT News, Jun. 7, 2007, http://web.mit.edu/newsoffice/2007/wireless-0607.html.

(Continued)

*Primary Examiner* — Adi Amrany
(74) *Attorney, Agent, or Firm* — Steven M. Greenberg, Esq.; Carey, Rodriguez, Greenberg & O'Keefe (57) ABSTRACT

A wireless power infrastructure for delivering wireless power from a wireless network to mobile devices. The infrastructure includes a plurality of power transmission hubs, each hub having: a first capacitor for transmitting a signature frequency for a defined range; and a set of second capacitors, each for transmitting resonant wireless power within the defined range at a selectable frequency. A mobile device for obtaining wireless resonant the plurality of power transmission hubs is also described, and includes: a first variable capacitor for detecting a signature frequency associated with a proximately located power transmission hub; a second variable capacitor for receiving wireless resonant capacitor from the proximately located power transmission hub; and a synchronization system for setting the second variable capacitor to a frequency that is synchronized with a wireless resonant power transmission of the proximately located power transmission hub.

27 Claims, 4 Drawing Sheets

(56) References Cited

U.S. PATENT DOCUMENTS

| | | | |
|---|---|---|---|
| 2005/0029351 A1* | 2/2005 | Yoshinaga et al. | 235/451 |
| 2005/0068019 A1* | 3/2005 | Nakamura et al. | 323/355 |
| 2006/0281454 A1* | 12/2006 | Gray | 455/426.1 |
| 2007/0021140 A1 | 1/2007 | Keyes, IV et al. | |
| 2007/0145830 A1* | 6/2007 | Lee et al. | 307/135 |
| 2007/0194749 A1* | 8/2007 | Delanghe et al. | 320/109 |
| 2009/0026844 A1* | 1/2009 | Iisaka et al. | 307/104 |
| 2009/0072629 A1 | 3/2009 | Cook et al. | |
| 2009/0127937 A1* | 5/2009 | Widmer et al. | 307/149 |
| 2009/0243397 A1* | 10/2009 | Cook et al. | 307/104 |
| 2009/0284227 A1* | 11/2009 | Mohammadian et al. | 320/137 |
| 2009/0284369 A1* | 11/2009 | Toncich et al. | 340/539.3 |
| 2010/0328967 A1* | 12/2010 | Cody et al. | 363/21.02 |
| 2011/0285210 A1* | 11/2011 | Lemmens et al. | 307/104 |

OTHER PUBLICATIONS

Karalis et al., "Efficient Wireless Non-Radiative Mid-Range Energy Transfer", Annals of Physics 323, 2008, pp. 34-48.

Kurs et al., "Wireless Power Transfer via Strongly Coupled Magnetic Resonances", www.sciencemag.org, vol. 317, Jul. 6, 2007, pp. 83-86.

* cited by examiner

WIRELESS POWER INFRASTRUCTURE

FIELD OF THE INVENTION

This disclosure relates to wireless power, and more particularly relates to a system and method of handing off wireless power to a mobile device from one hub to another in a wireless power network.

BACKGROUND OF THE INVENTION

Various methods of transmitting power wirelessly are known, including electromagnetic radiation. Such radiation is commonly used for wireless transmission of information, such as radio waves. Unfortunately, such transmissions are not an effective means for power transmission since the radiation disperses the energy in all directions.

One promising technology for transmitting wireless power is based on using coupled resonant objects. Two resonant objects of the same resonant frequency tend to exchange energy efficiently, while interacting weakly with extraneous off-resonant objects. An example of such a process is described in "Goodbye wires . . . ," http://web.mit.edu/newsoffice/2007/wireless-0607.html, Franklin Hadley, Institute for Soldier Nanotechnologies, Jun. 7, 2007. In the described experiment, magnetically coupled resonators consisting of two copper coils (one for sending and one for receiving) are utilized to send and receive a non-radiative magnetic field that oscillates at a coupled MHz frequency. As noted, the advantage of using non-radiative fields is that most of the power not received by the receiving coils is bound to the vicinity of the sending unit, as opposed to being radiated into the environment.

Unfortunately, wireless power transmissions are limited to very short distances (e.g., a few meters). At present, there exist no practical implementations for delivering wireless power to a device that is moving about an expansive area.

SUMMARY OF THE INVENTION

The present invention relates to a system and method for managing and handing off wireless power to a mobile device in a wireless power network. The invention allows a device to hop from one wireless power transmission hub to another without losing wireless power transmission to the device. A network of wireless transmitters can thus be provided to provide continuous power to a device.

In one embodiment, there is a wireless power infrastructure for delivering wireless power from a wireless network to mobile devices, the infrastructure has a plurality of power transmission hubs, with each hub comprising: a first capacitor for transmitting a signature frequency for a defined range; a set of second capacitors, each for transmitting resonant wireless power within the defined range at a selectable frequency.

In a second embodiment, there is a mobile device having a wireless power management system for obtaining wireless resonant power from a wireless power network having a plurality of power transmission hubs, comprising: a first variable capacitor for detecting a signature frequency associated with a proximately located power transmission hub; a second variable capacitor for receiving wireless resonant capacitor from the proximately located power transmission hub; and a synchronization system for setting the second variable capacitor to a frequency that is synchronized with a wireless resonant power transmission of the proximately located power transmission hub.

In a third embodiment, there is a method of obtaining wireless resonant power with a mobile device in a wireless power network, comprising: identifying a first signature frequency using a first variable capacitor; associating a first hub with the first signature frequency; communicating with the first hub to establish a power transmission frequency; adjusting a second variable capacitor to the power transmission frequency; and receiving wireless resonant power via the second variable capacitor from the first hub.

In a fourth embodiment, there is a method for delivering wireless power from a hub in a wireless power network to a mobile device, comprising: transmitting a signature frequency to a defined range from a first capacitor; receiving a communication from a mobile device that the mobile device is within the defined range and requires wireless power; setting a selected frequency of a variable capacitor; communicating the selected frequency to the mobile device; and transmitting resonant wireless power at the selected frequency.

In a fifth embodiment, there is method of obtaining wireless resonant power with a mobile device in a wireless power network, comprising: transmitting a signature frequency using a first capacitor from a mobile device; receiving the signature frequency at a proximately located power transmission hub; establishing a communication between the power transmission hub and mobile device to select a power transmission frequency; adjusting a second variable capacitor at the power transmission hub to the selected power transmission frequency; adjusting a variable capacitor at the mobile device to the selected power transmission frequency; and receiving wireless resonant power via the variable capacitor from the power transmission hub.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides an implementation for a wireless power network in which wireless power being delivered to one or more devices in the network can be handed off between power transmission hubs ("hubs"). Wireless power may be delivered using any now known or later developed technology, including non-radiative resonant power exchange ("resonant power"). Resonant power provides high efficiency near-field power transmission among devices having matched transmit and receive frequencies.

Figure 1:
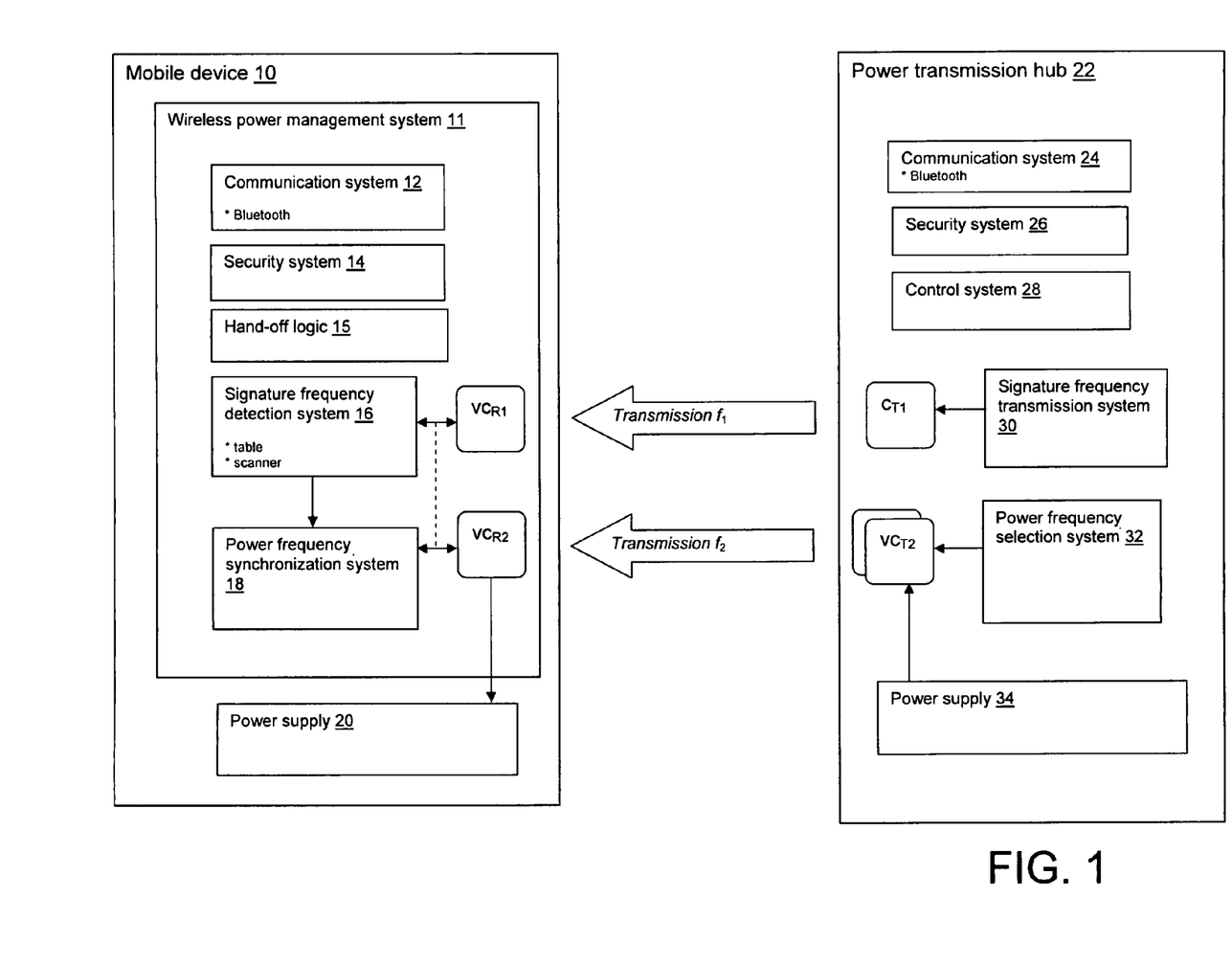
FIG. 1 depicts an illustrative mobile device and power transmission hub configuration in accordance with an embodiment of the present invention.

FIG. 1 depicts an illustrative mobile device 10 and power transmission hub 22 configured to operate within such a wireless power network. As detailed herein, mobile device 10 "hops" from one power transmission hub 22 to another based on proximity as mobile device 10 moves throughout the network (See, e.g., FIG. 2). In FIG. 1, mobile device 10 is shown interfacing with proximately located power transmission hub 22.

Mobile device 10 may comprise any type of portable device that requires power, such as a phone, hand held device, computer, portable appliance, MP3 player, etc. In general, mobile device 10 includes a power supply 20 for supplying power to the mobile device 10 and a wireless power management system 11 for obtaining wireless power and distributing power to the power supply 20. Power supply 20 may include other integrated power sources such as a rechargeable battery, solar device, fuel cell, etc.

Wireless power management system 11 generally includes a first variable capacitor ($VC_{R1}$) for detecting a signature frequency $f_1$ and a second variable capacitor ($VC_{R2}$) for receiving a wireless power transmission at a second frequency $f_2$. A signature frequency may comprise a magnetic field that is given off by a hub, which is unusable as a source of wireless power, but still detectable. The signature frequency is unique to each hub in the network. Accordingly, by simply observing a signature frequency, mobile device 10 can determine exactly what hub is nearby. First variable capacitor ($VC_{R1}$) is controlled by a signature frequency detection system 16 that detects the signature frequency of any available (i.e., proximately located) hub. Detection of a signature frequency may be done in any manner, e.g., scanning a range of frequencies available as signature frequencies, scanning a set of frequencies provided in a table, utilizing an inputted key that corresponds to one or more signature frequencies, etc. By varying the capacitance of the variable capacitor, different frequencies can be analyzed for an existing signature.

Once a signature frequency of a new hub is detected, wireless power management system 11 defers to hand-off logic 15 to determine if mobile device 10 should begin receiving power from the new hub associated with the detected signature frequency. Namely, in the case where mobile device 10 is in the range of both a currently used hub and a new "approaching" hub, hand-off logic 15 must determine which power transmission hub to utilize. In a simple case, hand-off logic 15 could utilize the hub that has the strongest signature frequency. In other cases, more complex logic may be implemented. For instance, the direction and velocity at which the mobile device 10 is moving may be studied to determine which hub to utilize.

Assuming in FIG. 1 that hand-off logic 15 determines that mobile device 10 should utilize power from power transmission hub 22, the second variable capacitor ($VC_{R2}$) must be tuned to the same frequency $f_2$ as the frequency used to generate power by the power transmission hub 22. This can be done in any manner. In a simple embodiment, the signature frequency itself could be used to calculate or determine the power transmission frequency, i.e., the power transmission frequency $f_2$ could be determined by plugging the signature frequency $f_1$ into a look-up table. In a more robust embodiment, communication system 12 could be utilized to communicate with a communication system 24 of the power transmission hub 22 (e.g., using Bluetooth) to select/set a power transmission frequency at which power will be transmitted and received. This approach allows power transmission hub 22 to, among other things, service multiple mobile devices at different frequencies. It also can be used to provide security by allowing the frequency selection process to be encrypted. Regardless, once power transmission frequency $f_2$ is determined, power frequency synchronization system 18 can synchronize the second variable capacitor ($VC_{R2}$) to the matching transmission frequency to obtain power for power supply 20.

Wireless power management system 11 may also include a security system 14 for providing encryption and decryption services. For instance, a key may be required to be entered into an I/O system (not shown) associated with the mobile device 10 to gain access to wireless power network.

Power transmission hub 22 generally includes a first capacitor $C_{T1}$ for transmitting the signature frequency $f_1$, which is controlled by signature frequency transmission system 30. Typically, first capacitor $C_{T1}$ need not comprise a variable capacitor since the signature frequency $f_1$ is preferably fixed. A second capacitor set $VC_{T2}$ is provided for generating one or more wireless power transmission signals $f_2$. In one embodiment, power transmission hub 22 may simply generate the power transmission signal $f_2$ at a fixed frequency. In a more robust embodiment, power transmission signal $f_2$ is variable, such that different mobile devices can obtain wireless power at different frequencies. In this embodiment, a plurality of capacitors $VC_{T2}$ are utilized, one for each transmitted power signal. Each such capacitor $VC_{T2}$ is controlled by a power frequency selection system 32, which causes each capacitor to transmit power from the power supply 34 at the selected frequency.

Power transmission hub 22 also includes a communication system 24 that allows the mobile device 10 to synchronize its receiving capacitor $VC_{R2}$ with the transmitting capacitor $VC_{T2}$. A control system 28 may be utilized to turn on and turn off power transmissions via the transmitting capacitors $VC_{T2}$ as mobile devices move in and out of range of the power transmission hub 22. Determining when a mobile device has left the range of the power transmission hub may be accomplished in any manner. For example, power transmission hub may be networked with all of the other power transmitting hubs to determine which hub is handling a given device. Alternatively, communication systems 12 and 24 could from time to time signal each other to indicate that the mobile device 10 is continuing to accept power from power transmission hub 22. Further, if the mobile device 10 moves to another hub, a disengagement signal could be transmitted from communication system 12 to communication system 24.

Power transmission hub 22 may likewise include a security system 26 for providing encrypted wireless power. Any type of security could be utilized limit access to the power transmission hub (e.g., a password, etc.). Power frequency selection could be dictated based on an encryption scheme.

In one further embodiment, mobile device 10 may include a mechanism within hand-off logic 15 for dynamically switching roles of the two capacitors $VC_{R1}$ and $VC_{R2}$. During the short time when the mobile device 10 is in the transition between the range of a current hub and the range of an approaching new hub, the mobile device 10 will switch the role of the capacitors. The capacitor that was previously used for sensing nearby signature frequencies will be used to connect to the approaching hub for power. The capacitor that was previously used for connecting to hubs for wireless power will be used to sense nearby signature frequencies. This helps to ensure a smooth hand-off from one hub to another.

An illustrative implementation is as follows. When a user walks into an area that will serve wireless power, the user is given a frequency that the user's mobile device will be listening on to receive the wireless power (the user could also be given a key, in the case of encrypted wireless power). The user's mobile device is given a list of all signature frequencies in the wireless power network, and a corresponding Bluetooth (or similar wireless communication) "IP address" (e.g., a "hash map" where the signature frequency is the key and the "IP address" is the value). The hub nearest the device will then transmit power for the user at the frequency given to the user (or according to the key, in the case of encrypted wireless power). When the user moves out of the range of one wireless power hub and into the range of another (as detected by the aforementioned capacitor inside of the device that is used for sensing signature frequencies), the mobile device will notice the signature frequency of the approaching hub, and look up the "IP address" of that hub, in order to communicate with it wirelessly. It then communicates to the hub using Bluetooth (or similar technology) to begin receiving wireless power.

The approaching hub will then begin transmitting wireless power at the frequency the mobile device is synchronized. The mobile device then communicates back to the previous hub and tells it to stop sending wireless power, as it is no longer using the power from that hub. If the user is equidistant to two different hubs, the device may stay connected to the previous hub in order to avoid flaky disconnects and connects. A hand-off threshold can be set to define how much closer the device must be to the approaching new hub from the previous hub before it performs the switch. In an alternative embodiment the power from each hub need not be turned on/off based on whether a user is nearby, it could just remain on.

Figure 4:
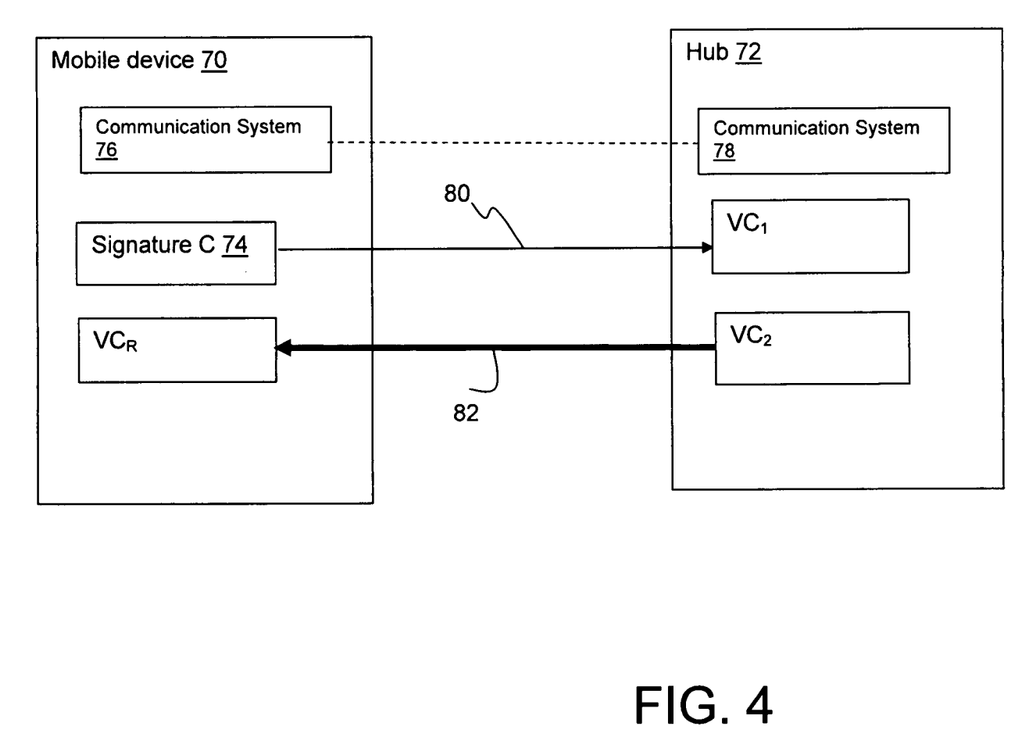
FIG. 4 an alternative implementation of a mobile device and power transmission hub configuration in accordance with an embodiment of the present invention.

Referring to FIG. 4, an alternative embodiment is depicted involving mobile device 70 and hub 72. In this case, the mobile device 70 is equipped with a system for transmitting a fixed signature frequency 80 (e.g., based on a phone number of a cell device) using a signature capacitor 74. The nearby hub 72 will then detect that the mobile device 70 is in range using variable capacitor $VC_1$, and begin serving wireless power 82 to the mobile device 70 using variable capacitor $VC_2$. Communication system 76 and 78 may be utilized to set the power transmission frequency, as described above. When the mobile device 70 leaves the range of one hub 72, and enters the range of another new hub, the approaching new hub will detect the mobile device's signature frequency 80 and begin serving power to it, and then communicate to the previous hub 72 to stop serving power.

In a further embodiment, the mobile device is not given a "hash map" of all signature frequencies and corresponding "IP addresses." Instead, the Bluetooth (or similar technology) range of the wireless power transmission hubs is limited so that the mobile device can only communicate with a hub that is in wireless power range. This way, the mobile device simply needs to communicate with whichever hub it can and tell it to begin wireless power transmission, and that hub will always be the closest hub.

Further, the mobile device may tell the previous hub to turn off instead of telling the approaching hub to turn on. The previous hub can then tell the approaching hub to turn on. Alternatively, the mobile device can tell the approaching hub to turn on, but not tell the previous hub to turn off. The approaching hub instead tells the previous hub to turn off.

Figure 2:
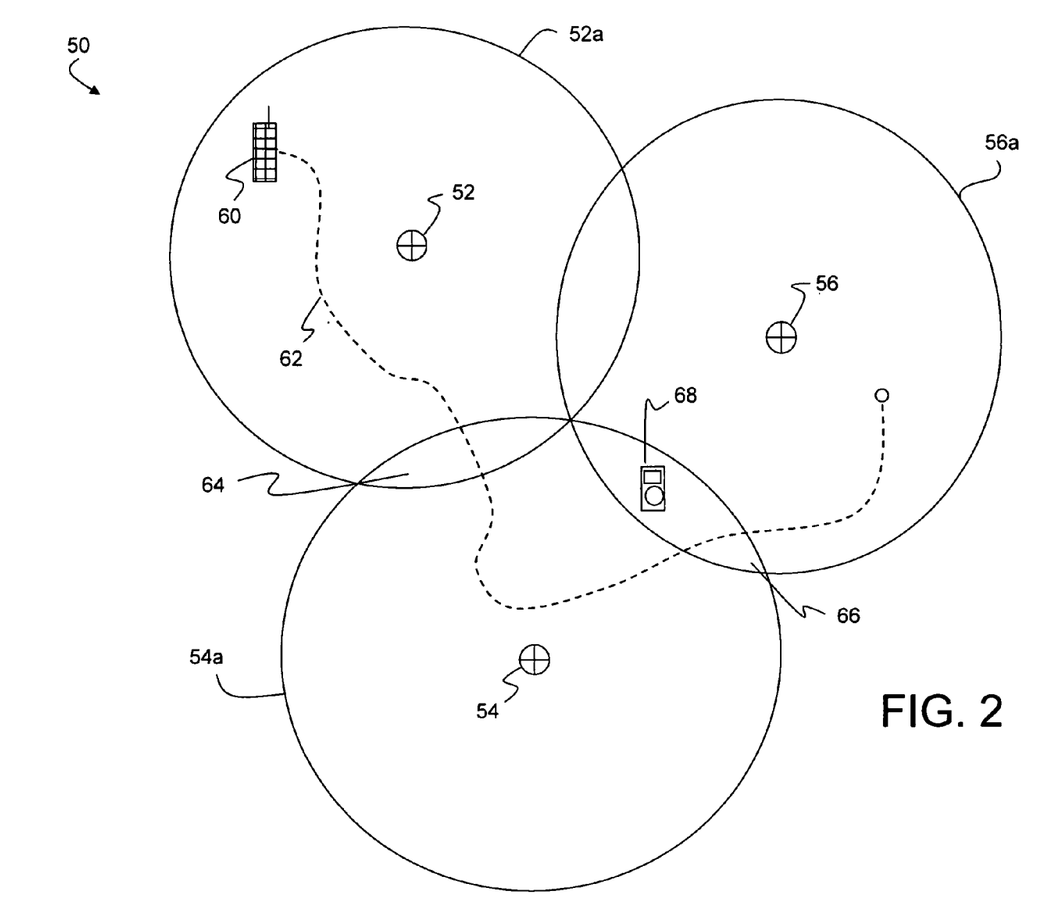
FIG. 2 depicts a wireless power network in accordance with an embodiment of the present invention.

FIG. 2 depicts an illustrative wireless power network 50 that includes three hubs 52, 54, 56. Each hub 52, 54, 56 includes an associated range or zone 52a, 54a, 56a, respectively, within which a mobile device 60 can receive wireless power via a wireless power frequency. As noted above, each range also includes a signature frequency generated by a hub that associates the signature frequency to the hub. In the example shown, mobile device 60 travels along path 62 such that power is obtained from each of the three hubs. When the mobile device 60 is within range 52a it recognizes and receives power from hub 52, when it is in range 54a it recognizes and receives power from hub 54 and when it is in range 56a, it recognizes and receives power from hub 56.

However, as the mobile device 60 moves from one range 52a to another range 54a, there is a hand-off area 64 within which the device 60 has access to two hubs, 52 and 54. In one embodiment, hand-off logic 15 (FIG. 1) within device 60 determines when power from hub 52 should be terminated and power from hub 54 should be initiated. This can be done, for instance, by determining which signature frequency is the strongest, how quickly the device is moving, what direction the device is moving in, etc. In some situations, it may be preferable to stay connected to the current hub as long as possible in order to avoid unnecessary switching back and forth, such as where a user was sitting with a device 68 in a hand-off area 66.

Figure 3:
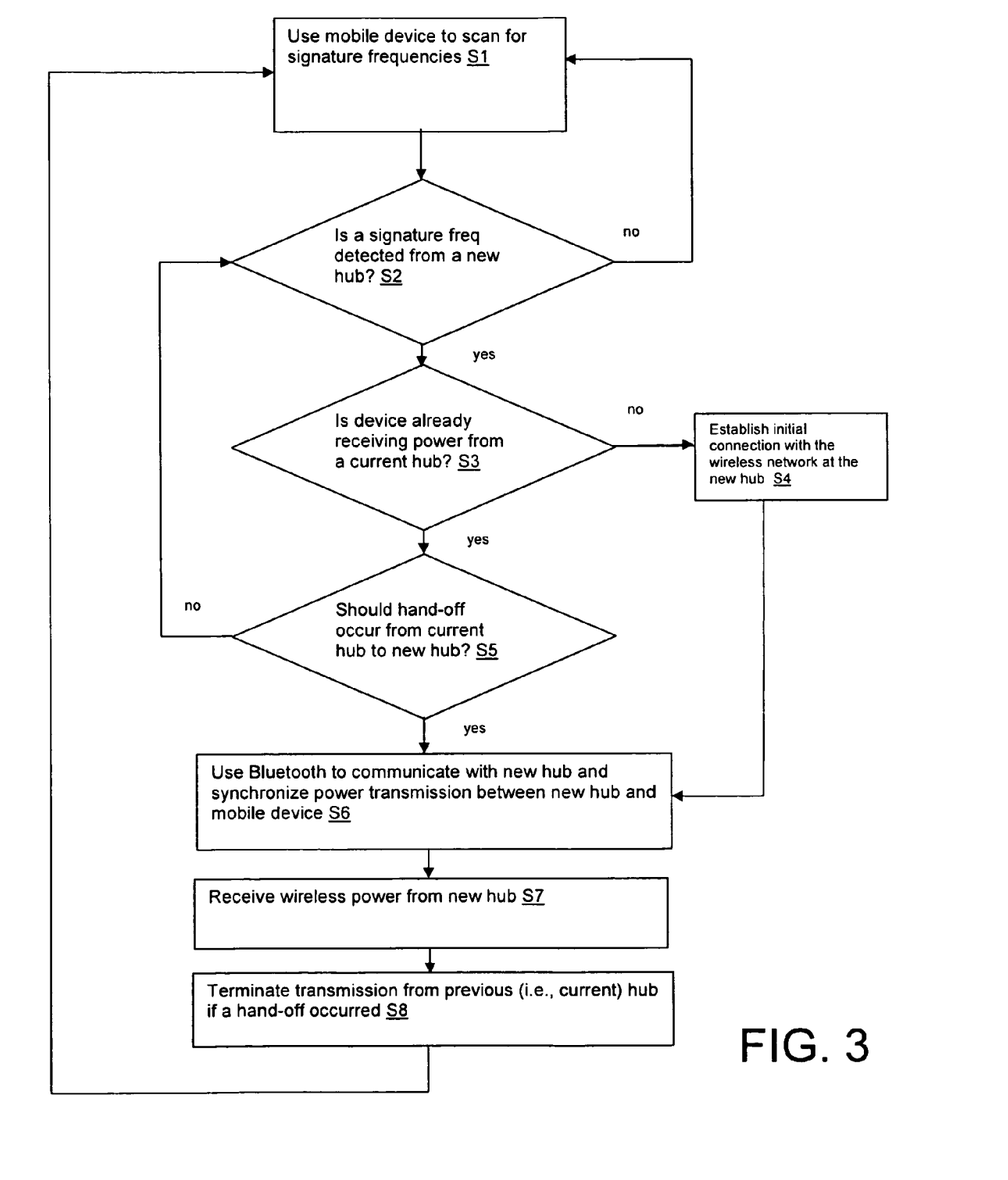
FIG. 3 depicts a flow diagram describing operation of a device in a wireless power network in accordance with an embodiment of the present invention.

FIG. 3 depicts and illustrative flow diagram for implementing the above described process. At S1, a mobile device is used to scan for signature frequencies. At S2, a determination is made whether a signature frequency is detected from a new hub (i.e., has a mobile device traveled from one hub to another, just been turned on, just moved into the wireless network, etc.). If no, the process returns to S1 and the scan continues. This occurs if no hub at all is detected or a current hub is serving the device. If yes, then a determination is made at S3 whether the device is already receiving power from a current hub, i.e., is the device in range of both a current and new hub. If no, then at S4 an initial connection is established with the wireless network, including: using Bluetooth to communicate with the new hub and synchronize power transmission between the new hub and the mobile device at S6 and receiving wireless power from the new hub at S7.

If at S3 the device was already receiving power from a current hub, then a determination at S5 is made whether a "hand-off" should occur from the current hub to the new hub. As discussed, hand-off logic may be utilized to, e.g., determine which signature frequency is the strongest, the direction and speed the device is moving from one zone to another, etc. If a hand-off is not warranted, the process loops back to S2. If a hand-off is warranted at S5, then Bluetooth is used to communicate with the new hub to synchronize power transmission between the new hub and the mobile device at S6 and wireless power is received from the new hub at S7. In the case where a hand-off occurred, transmission from the previous (i.e., current) hub is terminated at S8, and the process loops back to S1 where it is repeated.

Referring again to FIG. 1, it is understood that the wireless power management system 11 may be implemented as any type of computing device or infrastructure. Such a computing device generally includes a processor, input/output (I/O), memory, and bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computer system and likewise may comprise any known type of transmission link, including electrical, optical, wireless, etc. Although not shown, additional components, such as cache memory, communication systems, system software, etc., may be incorporated into wireless power management system 11.

Access to wireless power management system 11 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a wireless power management system 11 could be created, maintained and/or deployed by a service provider that offers the functions described herein for customers. That is, a service provider could offer to deploy or provide the ability to integrate a wireless power management system 11 as described above into an existing device.

It is understood that in addition to being implemented as a system and method, the features may be provided as a program product stored on a computer-readable medium, which when executed, enables a computing device to provide a wireless power management system 11. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent hardware, a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A wireless power infrastructure for delivering wireless power from a wireless network to mobile devices, the infrastructure comprising:
   a plurality of power transmission hubs, each hub including:
      a first capacitor that generates a fixed signature frequency to uniquely identify the hub for a defined range, wherein the fixed signature frequency is unusable as a source of wireless power, but is detectable by a mobile device within the defined range; and
      a set of second variable capacitors, each generates resonant wireless power to a mobile device within the defined range at a selectable frequency,
   wherein a mobile device receives wireless power from a hub that transmits the strongest signature frequency to the mobile device while the mobile device moves within the network.

2. The wireless power infrastructure of claim 1, each hub further comprising a communication system for communicating with a mobile device residing within the defined range in order to synchronize a frequency of a second variable capacitor with a receiving variable capacitor in the mobile device.

3. The wireless power infrastructure of claim 2, wherein the communication system includes a system for communicating a hash map to the mobile device, wherein the hash map includes a list of frequencies associated with the plurality of power transmission hubs.

4. The wireless power infrastructure of claim 1, each hub further comprising a control system for turning each second variable capacitor on and off.

5. The wireless power infrastructure of claim 1, each hub further comprising a security system for limiting access to transmission of resonant wireless power.

6. A mobile device having a wireless power management system for obtaining wireless resonant power from a wireless power network having a plurality of power transmission hubs, comprising:
   a first variable capacitor for detecting a signature frequency associated with a proximately located power transmission hub, the signature frequency being a fixed frequency unique to the hub, wherein the fixed signature frequency is unusable as a source of wireless power, but is detectable by the mobile device to identify the hub;

a second variable capacitor for receiving wireless resonant power from the proximately located power transmission hub; and a synchronization system for setting the second variable capacitor to a frequency that is synchronized with a wireless resonant power transmission of the proximately located power transmission hub, wherein the mobile device receives wireless resonant power from a hub that transmits the strongest signature frequency to the mobile device while the mobile device moves within the network.

7. The mobile device of claim 6, further comprising a signature frequency detection system for causing the first variable capacitor to vary capacitance to scan for signature frequencies.

8. The mobile device of claim 6, further comprising a communication system for communicating with the proximately located power transmission hub to set the frequency for wireless resonant power transmission between the mobile device and proximately located power transmission hub.

9. The mobile device of claim 6, further comprising hand-off logic for terminating reception of wireless resonant power from a current hub and for activating reception of wireless resonant power from a new hub as the device moves closer to the new hub and away from the current hub.

10. The mobile device of claim 9, wherein the hand-off logic includes logic for analyzing signal strengths of the signature frequencies of the current hub and new hub.

11. The mobile device of claim 9, wherein the hand-off logic includes logic for causing the first variable capacitor and the second variable capacitor to switch roles during a hand-off process.

12. The mobile device of claim 9, wherein the hand-off logic includes logic for causing a signal to be transmitted to the current hub directing the current hub to cease transmitting power to the mobile device.

13. The mobile device of claim 9, wherein the hand-off logic includes logic for causing a signal to be transmitted to the new hub directing the new hub to begin transmitting power to the mobile device.

14. The mobile device of claim 6, further comprising a security system for enabling the mobile device to participate in the wireless power network.

15. The mobile device of claim 6, further comprising a system for receiving a hash map that includes a list of frequencies associated with the plurality of power transmission hubs.

16. A method of obtaining wireless resonant power with a mobile device in a wireless power network, comprising:
identifying a first signature frequency using a first variable capacitor, the signature frequency being a fixed frequency uniquely identifying each of a plurality of hubs in the wireless power network, wherein the fixed signature frequency is unusable as a source of wireless power, but is detectable by the mobile device within a defined range of the hub;
associating a first hub with the first signature frequency;
communicating with the first hub to establish a power transmission frequency;
adjusting a second variable capacitor to the power transmission frequency; and
receiving wireless resonant power via the second variable capacitor from the first hub,
wherein the mobile device receives wireless resonant power from a hub that transmits the strongest signature frequency to the mobile device while the mobile device moves within the wireless power network.

17. The method of claim 16, further comprising implementing a hand-off process if a second signature frequency associated with a second hub is detected while the mobile device is receiving wireless resonant power from the hub.

18. The method of claim 17, wherein the hand-off process includes determining a strength of the first signature frequency and a strength of the second signature frequency.

19. The method of claim 17, wherein the hand-off process includes:
communicating with the second hub to establish a new power transmission frequency;
adjusting a second variable capacitor to the new power transmission frequency; and
receiving wireless resonant power via the second variable capacitor from the second hub.

20. The method of claim 19, wherein the hand-off process includes causing the first hub to terminate power transmission by transmitting a signal to the first hub.

21. The method of claim 19, wherein the hand-off process includes causing the second hub to begin power transmission by transmitting a signal to the first hub.

22. The method of claim 19, wherein the hand-off process causes the first variable capacitor and the second variable capacitor to switch roles.

23. A method for delivering wireless power from a hub in a wireless power network having a plurality of power transmission hubs to a mobile device, comprising:
generating a signature frequency to a defined range from a first capacitor, the signature frequency being a fixed frequency unique to the hub, wherein the fixed signature frequency is unusable as a source of wireless power, but is detectable by a mobile device within the defined range;
receiving a communication from a mobile device that the mobile device is within the defined range and requires wireless power;
setting a selected frequency of a variable capacitor;
communicating the selected frequency to the mobile device; and
transmitting resonant wireless power at the selected frequency,
wherein the mobile device receives wireless resonant power from a hub that transmits the strongest signature frequency to the mobile device while the mobile device moves within the wireless power network.

24. The method of claim 23, further comprising utilizing a control system to disable transmission of the resonant wireless power.

25. The method of claim 23, further comprising communicating with a second hub that previously provided resonant wireless power to the mobile device that the second hub should terminate transmission of resonant wireless power to the mobile device.

26. The method of claim 23, further comprising:
receiving a communication from the mobile device that transmission of resonant wireless power to the mobile device is no longer required; and
communicating to a new hub that transmission of resonant wireless power to the mobile device is required.

27. The method of claim 23, further comprising providing a security system to limit access to the hub.

* * * * *